(12) United States Patent
Uzawa et al.

(10) Patent No.: US 12,060,378 B2
(45) Date of Patent: Aug. 13, 2024

(54) SOLID CATALYST COMPONENT FOR OLEFIN POLYMERIZATION, METHOD FOR PRODUCING SOLID CATALYST COMPONENT FOR OLEFIN POLYMERIZATION, METHOD FOR PRODUCING CATALYST FOR OLEFIN POLYMERIZATION AND METHOD FOR PRODUCING POLYMER OF OLEFIN

(71) Applicant: TOHO TITANIUM CO., LTD., Chigasaki (JP)

(72) Inventors: Tsutomu Uzawa, Chigasaki (JP); Toshiya Uozumi, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 201 days.

(21) Appl. No.: 17/715,343

(22) Filed: Apr. 7, 2022

(65) Prior Publication Data

US 2022/0372052 A1    Nov. 24, 2022

(30) Foreign Application Priority Data

Apr. 28, 2021 (JP) ................................. 2021-075913
Mar. 1, 2022 (JP) ................................. 2022-031318

(51) Int. Cl.
| | | |
|---|---|---|
| *C08F 110/06* | (2006.01) | |
| *C07F 7/28* | (2006.01) | |
| *C08F 4/649* | (2006.01) | |
| *C08F 4/653* | (2006.01) | |
| *C08F 4/654* | (2006.01) | |
| *C08F 210/06* | (2006.01) | |

(52) U.S. Cl.
CPC .............. *C07F 7/28* (2013.01); *C08F 4/6494* (2013.01); *C08F 4/653* (2013.01); *C08F 4/654* (2013.01); *C08F 110/06* (2013.01); *C08F 210/06* (2013.01)

(58) Field of Classification Search
CPC ...... C08F 110/06; C08F 210/06; C08F 4/649; C08F 4/653; C08F 4/6546
See application file for complete search history.

(56) References Cited

U.S. PATENT DOCUMENTS

2015/0240003 A1* 8/2015 Hosaka ................. C08F 110/06
502/115

FOREIGN PATENT DOCUMENTS

| JP | 2005-112920 A | 4/2005 |
| JP | 2006-016607 A | 1/2006 |
| JP | 2009-263678 A | 11/2009 |

* cited by examiner

*Primary Examiner* — Caixia Lu
(74) *Attorney, Agent, or Firm* — WHDA, LLP

(57) ABSTRACT

Provided is a solid catalyst component for olefin polymerization which is capable of exerting favorable ethylene responsiveness while forming a propylene homopolymer having high stereoregularity, when subjected to ethylene-propylene copolymerization reaction. The present invention provides a solid catalyst component for olefin polymerization, comprising titanium, magnesium, halogen, and an internal electron-donating compound, wherein the internal electron-donating compound comprises an electron-donating compound (i) having a phthalic acid ester structure, and an electron-donating compound (ii) having two or more kinds of groups selected from an ether group, an ester group and a carbonate group and having no phthalic acid ester structure, wherein a content ratio of the electron-donating compound (ii) having two or more kinds of groups selected from an ether group, an ester group and a carbonate group and having no phthalic acid ester structure is 0.5 to 1.5% by mass.

8 Claims, No Drawings

SOLID CATALYST COMPONENT FOR OLEFIN POLYMERIZATION, METHOD FOR PRODUCING SOLID CATALYST COMPONENT FOR OLEFIN POLYMERIZATION, METHOD FOR PRODUCING CATALYST FOR OLEFIN POLYMERIZATION AND METHOD FOR PRODUCING POLYMER OF OLEFIN

BACKGROUND OF THE INVENTION

Field of the Invention

The present invention relates to a solid catalyst component for olefin polymerization, a method for producing a solid catalyst component for olefin polymerization, a method for producing a catalyst for olefin polymerization and a method for producing a polymer of an olefin.

Description of the Related Art

Heretofore, solid catalyst components for olefin polymerization (hereinafter, appropriately referred to as solid catalyst components) have been widely known in which a transition metal catalyst component such as titanium is supported on a support. A large number of solid catalyst components containing magnesium, titanium, halogen and an internal electron-donating compound (hereinafter, appropriately referred to as an internal electron donor) as essential components have been proposed as solid catalyst components for olefin polymerization which are used in the polymerization of an olefin such as propylene.

For example, Japanese Patent Laid-Open No. 2005-112920 describes a solid titanium catalyst component for olefin polymerization, comprising titanium, magnesium, halogen and an electron donor, wherein i) average particle size d is 25 to 100 μm, and ii) particle strength N (MPa) satisfies the expression "$N > 8000 \times d^{-2}$". This solid titanium catalyst component for olefin polymerization employs an electron donor containing one or more compounds having two or more ether bonds present via a plurality of carbon atoms, and one or more carboxylic acid ester compounds.

Japanese Patent Laid-Open No. 2005-112920 states that: an olefin (co)polymer having stereospecificity and good morphology is obtained in high catalyst Yield; and a solid titanium catalyst component for olefin polymerization can be provided in order to obtain a catalyst produced using a special electron donor.

Japanese Patent Laid-Open No. 2006-016607 describes a solid catalyst component for α-olefin polymerization, containing a titanium atom, a magnesium atom, a halogen atom, a phthalic acid ester compound and a 1,3-diether compound. In this solid catalyst component for α-olefin polymerization, the molar ratio of the 1,3-diether compound to the phthalic acid ester compound is 0.1 to 3.

Japanese Patent Laid-Open No. 2006-016607 states that a solid catalyst component for α-olefin polymerization can be provided which has high stereoregular polymerization ability and is excellent in property of controlling a molecular weight by hydrogen (the phthalic acid ester compound and the 1,3-diether compound of Japanese Patent Laid-Open No. 2006-016607 correspond to the electron donor of Japanese Patent Laid-Open No. 2005-112920).

Japanese Patent Laid-Open No. 2009-263678 describes a solid catalyst component being magnesium, titanium, halogen and at least two electron-donating compounds selected from predetermined ethers. This solid catalyst component employs an electron-donating compound selected from esters of mono or polycarboxylic acid, and an electron-donating compound selected from diethers.

Japanese Patent Laid-Open No. 2009-263678 states that a solid catalyst component for olefin polymerization can be provided which can prepare a propylene polymer that is highly insoluble in xylene and exhibits a high range of isotacticity.

However, the studies of the present inventors have revealed that the solid catalyst components for olefin polymerization described in Japanese Patent Laid-Open Nos. 2005-112920, 2006-016607 and 2009-263678 have a higher content ratio of a diether compound than that of a phthalic acid ester compound and therefore have technical problems such as poor stereoregularity of a propylene homopolymer or low reactivity of ethylene (ethylene response) at the time of ethylene-propylene copolymerization.

The low reactivity of ethylene in ethylene-propylene copolymerization (ICP polymerization) is unfavorable in terms of production efficiency because a large amount of ethylene needs to be fed for the copolymerization. Furthermore, when a large amount of ethylene is mixed into unreacted monomers, their separation from propylene is difficult. This influences the production process of ICP polymerization using recovered monomers after copolymerization reaction.

Moreover, a large amount of a copolymerized moiety produced in the resulting ethylene-propylene copolymer (ICP) is also indispensable from the viewpoint of improvement in impact resistance.

Under these circumstances, an object of the present invention is to provide a solid catalyst component for olefin polymerization which is capable of exerting favorable ethylene responsiveness while forming a propylene homopolymer having high stereoregularity, when subjected to ethylene-propylene copolymerization reaction, and to provide a method for producing a solid catalyst component for olefin polymerization, a method for producing a catalyst for olefin polymerization and a method for producing a polymer of an olefin.

SUMMARY OF THE INVENTION

As a result of conducting diligent studies, the present inventors have found that the technical problems described above can be solved by a solid catalyst component for olefin polymerization, comprising titanium, magnesium, halogen, and an internal electron-donating compound, wherein the internal electron-donating compound comprises an electron-donating compound (i) having a phthalic acid ester structure, and an electron-donating compound (ii) having two or more kinds of groups selected from an ether group, an ester group and a carbonate group and having no phthalic acid ester structure, wherein a content ratio of the electron-donating compound (ii) having two or more kinds of groups selected from an ether group, an ester group and a carbonate group and having no phthalic acid ester structure is 0.5 to 1.5% by mass. The present inventors have completed the present invention on the basis of these findings.

Specifically, the present invention provides
(1) a solid catalyst component for olefin polymerization, comprising titanium, magnesium, halogen, and an internal electron-donating compound, wherein
the internal electron-donating compound comprises
an electron-donating compound (i) having a phthalic acid ester structure, and an electron-donating compound (ii) having two or more kinds of groups selected from an ether group, an ester group and a carbonate group and having no phthalic acid ester structure, wherein
a content ratio of the electron-donating compound (ii) having two or more kinds of groups selected from an ether group, an ester group and a carbonate group and having no phthalic acid ester structure is 0.5 to 1.5% by mass, (2) a method for producing a solid catalyst component for olefin polymerization, comprising in order the steps of:
(a) contacting dialkoxy magnesium, a tetravalent titanium halogen compound, and an electron-donating compound (i) having a phthalic acid ester structure with each other to obtain a contact product; and
(b) contacting the contact product, a tetravalent titanium halogen compound, and an electron-donating compound (ii) having two or more kinds of groups selected from an ether group, an ester group and a carbonate group and having no phthalic acid ester structure with each other, (3) a method for producing a catalyst for olefin polymerization, comprising contacting the solid catalyst component for olefin polymerization according to (1) or a solid catalyst component for olefin polymerization obtained by the production method according to (2), and an organoaluminum compound represented by the following general formula (I):

$$R^1_p AlQ_{3-p} \quad (I)$$

wherein $R^1$ is an alkyl group having 1 to 6 carbon atoms, Q is a hydrogen atom or a halogen atom, p is $0 < p \leq 3$, when a plurality of $R^1$ are present, these $R^1$ are the same as or different from each other, and when a plurality of Q are present, these Q are the same as or different from each other,
with each other to obtain a catalyst for olefin polymerization, (4) the method for producing a catalyst for olefin polymerization according to (3), comprising contacting the solid catalyst component for olefin polymerization according to (1) or the solid catalyst component for olefin polymerization obtained by the production method according to (2), the organoaluminum compound represented by the general formula (I), and further, an external electron-donating compound with each other to obtain a catalyst for olefin polymerization, and (5) a method for producing a polymer of an olefin, comprising polymerizing an olefin using a catalyst for olefin polymerization obtained by the production method according to (3) or (4).

The present invention can provide a solid catalyst component for olefin polymerization which is capable of exerting favorable ethylene responsiveness while forming a propylene homopolymer having high stereoregularity, when subjected to ethylene-propylene copolymerization reaction, and can provide a method for producing a solid catalyst component for olefin polymerization, a method for producing a catalyst for olefin polymerization and a method for producing a polymer of an olefin.

DETAILED DESCRIPTION OF THE PREFERRED EMBODIMENTS (Solid Catalyst Component for Olefin Polymerization)

First, the solid catalyst component for olefin polymerization according to the present invention will be described.

The solid catalyst component for olefin polymerization according to the present invention is a solid catalyst component for olefin polymerization, comprising titanium, magnesium, halogen, and an internal electron-donating compound, wherein the internal electron-donating compound comprises an electron-donating compound (i) having a phthalic acid ester structure, and an electron-donating compound (ii) having two or more kinds of groups selected from an ether group, an ester group and a carbonate group and having no phthalic acid ester structure, wherein a content ratio of the electron-donating compound (ii) having two or more kinds of groups selected from an ether group, an ester group and a carbonate group and having no phthalic acid ester structure is 0.5 to 1.5% by mass.

The solid catalyst component for olefin polymerization according to the present invention comprises titanium, magnesium, halogen and an internal electron-donating compound.

In the solid catalyst component for olefin polymerization according to the present invention, examples of the halogen include fluorine, chlorine, bromine and iodine atoms. Among them, chlorine, bromine or iodine is preferred, and chlorine or iodine is more preferred.

The solid catalyst component for olefin polymerization according to the present invention comprises an electron-donating compound (i) having a phthalic acid ester structure as the internal electron-donating compound.

In the solid catalyst component for olefin polymerization according to the present invention, the phrase "having a phthalic acid ester structure" means a compound having the following phthalic acid ester structure:

[Formula 1]

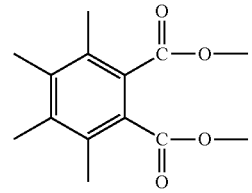

In the solid catalyst component for olefin polymerization according to the present invention, the electron-donating compound (i) having a phthalic acid ester structure is not particularly limited as long as the compound acts as an electron-donating compound in the solid catalyst component for olefin polymerization. Examples thereof can include one or more compounds selected from aromatic dicarboxylic acid diesters represented by the following general formula (II):

[Formula 2]

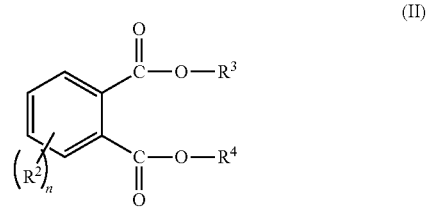
(II)

wherein each of $R^2$, $R^3$ and $R^4$ is an organic group, n is 0 to 4, and $R^2$, $R^3$ and $R^4$ are the same or different.

In the solid catalyst component for olefin polymerization according to the present invention, examples of the aromatic dicarboxylic acid diesters represented by the general formula (II) can include one or more compounds selected from phthalic acid diester, alkyl-substituted phthalic acid diester and halogen-substituted phthalic acid diester. Phthalic acid diester is preferred.

Specific examples of the aromatic dicarboxylic acid diesters include one or more compounds selected from: phthalic acid diesters such as dimethyl phthalate, diethyl phthalate, di-n-propyl phthalate, diisopropyl phthalate, di-n-butyl phthalate, diisobutyl phthalate, di-n-pentyl phthalate, diisopentyl phthalate, dineopentyl phthalate, di-n-hexyl phthalate, diphthalate, methylethyl phthalate, (ethyl)n-propyl phthalate, ethylisopropyl phthalate, (ethyl)n-butyl phthalate, ethylisobutyl phthalate, (ethyl)n-pentyl phthalate, ethylisopentyl phthalate, ethylneopentyl phthalate, and (ethyl) n-hexyl phthalate; alkyl-substituted phthalic acid diester such as diethyl 4-methylphthalate, di-n-propyl 4-methylphthalate, diisopropyl 4-methylphthalate, di-n-butyl 4-methylphthalate, and diisobutyl 4-methylphthalate; and halogen-substituted phthalic acid diesters such as diethyl 4-chlorophthalate, di-n-propyl 4-chlorophthalate, diisopropyl 4-chlorophthalate, di-n-butyl 4-chlorophthalate, diisobutyl 4-chlorophthalate, diethyl 4-bromophthalate, di-n-propyl 4-bromophthalate, diisopropyl 4-bromophthalate, di-n-butyl 4-bromophthalate, and diisobutyl 4-bromophthalate.

Among the aromatic dicarboxylic acid diesters, one or more compounds selected from diethyl phthalate, di-n-propyl phthalate, di-n-butyl phthalate, diisobutyl phthalate, and di-n-pentyl phthalate are preferred.

The solid catalyst component for olefin polymerization according to the present invention comprises an electron-donating compound (ii) having two or more kinds of groups selected from an ether group, an ester group and a carbonate group and having no phthalic acid ester structure as the internal electron-donating compound.

In the solid catalyst component for olefin polymerization according to the present invention, the electron-donating compound (ii) having two or more kinds of groups selected from an ether group, an ester group and a carbonate group and having no phthalic acid ester structure means a compound that has two or more kinds of groups selected from an ether group, an ester group and a carbonate group and lacks the following phthalic acid ester structure:

[Formula 3]

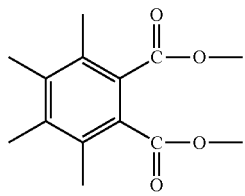

Hence, the electron-donating compound (ii) having two or more kinds of groups selected from an ether group, an ester group and a carbonate group and having no phthalic acid ester structure is selected from compounds other than compounds corresponding to the electron-donating compound (i) having a phthalic acid ester structure.

In the solid catalyst component for olefin polymerization according to the present invention, the electron-donating compound (ii) having two or more kinds of groups selected from an ether group, an ester group and a carbonate group and having no phthalic acid ester structure is not particularly limited as long as the compound acts as an electron-donating compound in the solid catalyst component for olefin polymerization.

In the solid catalyst component for olefin polymerization according to the present invention, specific examples of the electron-donating compound (ii) having two or more kinds of groups selected from an ether group, an ester group and a carbonate group and having no phthalic acid ester structure include one or more compounds selected from: compounds having a carbonate group, such as 2-ethoxyethyl methyl carbonate, 2-propoxyethyl methyl carbonate, 2-benzyloxyethyl phenyl carbonate, and 5-t-butyl-1,2-phenylene diphenyl dicarbonate; compounds having an ether group, such as 2-isopropyl-2-isobutyl-1,3-dimethoxypropane, 2-isopropyl-2-isopentyl-1,3-dimethoxypropane, and 9,9-bis(methoxymethyl)fluorene; monocarboxylic acid esters such as acetic acid ester, propionic acid ester, benzoic acid ester, p-toluic acid ester, and anisic acid ester; and dicarboxylic acid diesters such as maleic acid diester, 2,3-dialkylsuccinic acid diester, benzylidenemalonic acid diester, cyclohexane-1,2-dicarboxylic acid diester, 1-cyclohexene-1,2-dicarboxylic acid diester, 4-methylcyclohexane-1,2-dicarboxylic acid diester, 3-methylcyclohexane-1,2-dicarboxylic acid diester, 3,6-diphenylcyclohexane-1,2-dicarboxylic acid diester, and 3-methyl-6-n-propylcyclohexane-1,2-dicarboxylic acid diester. Among them, one or more compounds selected from compounds having an ether group, such as 2-isopropyl-2-isobutyl-1,3-dimethoxypropane, 2-isopropyl-2-isopentyl-1,3-dimethoxypropane, and 9,9-bis(methoxymethyl)fluorene, and compounds having a carbonate, such as 2-ethoxyethyl methyl carbonate, 2-propoxyethyl methyl carbonate, 2-benzyloxyethyl phenyl carbonate, and 5-t-butyl-1,2-phenylene diphenyl dicarbonate are particularly preferred.

The solid catalyst component for olefin polymerization according to the present invention may comprise other internal electron-donating compound(s) (hereinafter, referred to as an "additional internal electron-donating compound"), together with the electron-donating compound (i) having a phthalic acid ester structure and the electron-donating compound (ii) having two or more kinds of groups selected from an ether group, an ester group and a carbonate group and having no phthalic acid ester structure, as the internal electron-donating compound as long as the advantageous effects of the present invention are exerted.

The additional internal electron-donating compound is not particularly limited and is an organic compound other than the electron-donating compound (i) and the electron-donating compound (ii), preferably an organic compound containing an oxygen atom or a nitrogen atom. Examples thereof can include one or more compounds selected from alcohols, phenols, ethers, esters, ketones, acid halides, aldehydes, amines, amides, nitriles, isocyanates, and organosilicon compounds containing a Si—O—C bond or a Si—N—C bond.

The additional internal electron-donating compound is more preferably one or more compounds selected from ether compounds such as monoethers and ether carbonates, and esters such as monocarboxylic acid esters.

In the solid catalyst component for olefin polymerization according to the present invention, the atom-based content ratio of the titanium is preferably 0.5 to 8.0% by mass, more preferably 1.0 to 6.0% by mass, further preferably 1.0 to 4.0% by mass.

In the present application, the content ratio of the titanium in the solid catalyst component for olefin polymerization means a value measured in accordance with a method (redox titration) described in JIS 8311-1997 "Method for determination of titanium in titanium ores".

In the solid catalyst component for olefin polymerization according to the present invention, the atom-based content ratio of the magnesium is preferably 10.0 to 70.0% by mass, more preferably 10.0 to 50.0% by mass, further preferably 15.0 to 40.0% by mass, particularly preferably 15.0 to 25.0% by mass.

In the present application, the content ratio of the magnesium in the solid catalyst component for olefin polymerization means a value measured by an EDTA titration method which involves dissolving the solid catalyst component in a hydrochloric acid solution and titrating the magnesium atom with an EDTA solution.

In the solid catalyst component for olefin polymerization according to the present invention, the atom-based content ratio of the halogen is preferably 20.0 to 90.0% by mass, more preferably 30.0 to 85.0% by mass, further preferably 40.0 to 80.0% by mass, particularly preferably 45.0 to 75.0% by mass.

In the present application, the content ratio of the halogen in the solid catalyst component for olefin polymerization means a value measured by a silver nitrate titration method which involves treating the solid catalyst component with a mixed solution of sulfuric acid and pure water to prepare an aqueous solution, then sampling a predetermined amount, and titrating the halogen atom with a silver nitrate standard solution.

In the solid catalyst component for olefin polymerization according to the present invention, the content ratio of the electron-donating compound (i) having a phthalic acid ester structure among the compounds constituting the internal electron-donating compound is preferably 5 to 30% by mass, more preferably 7 to 25% by mass, further preferably 10 to 20% by mass.

The solid catalyst component for olefin polymerization according to the present invention in which the content ratio of the electron-donating compound (i) having a phthalic acid ester structure among the compounds constituting the internal electron-donating compound falls within the range described above can easily exert favorable ethylene responsiveness while forming a propylene homopolymer excellent in stereoregularity, when subjected to ethylene-propylene copolymerization reaction, by combination with the content ratio mentioned later that falls a particular range, of the electron-donating compound (ii) having two or more kinds of groups selected from an ether group, an ester group and a carbonate group and having no phthalic acid ester structure.

In the solid catalyst component for olefin polymerization according to the present invention, the content ratio of the electron-donating compound (ii) having two or more kinds of groups selected from an ether group, an ester group and a carbonate group and having no phthalic acid ester structure among the compounds constituting the internal electron-donating compound is 0.5 to 1.5% by mass, preferably 0.6 to 1.3% by mass, more preferably 0.8 to 1.2% by mass.

The solid catalyst component for olefin polymerization according to the present invention in which the content ratio of the electron-donating compound (ii) having two or more kinds of groups selected from an ether group, an ester group and a carbonate group and having no phthalic acid ester structure among the compounds constituting the internal electron-donating compound falls within the range described above can easily exert favorable ethylene responsiveness while forming a propylene homopolymer excellent in stereoregularity.

In the solid catalyst component for olefin polymerization according to the present invention, the total content ratio of the electron-donating compound (i) having a phthalic acid ester structure and the electron-donating compound (ii) having two or more kinds of groups selected from an ether group, an ester group and a carbonate group and having no phthalic acid ester structure is preferably 5.0 to 25.0% by mass, more preferably 8.0 to 22.0% by mass, further preferably 10.0 to 20.0% by mass.

In the solid catalyst component for olefin polymerization according to the present invention, a ratio represented by "content ratio (mol %) of the electron-donating compound (ii) having two or more kinds of groups selected from an ether group, an ester group and a carbonate group and having no phthalic acid ester structure/content ratio (mol %) of the electron-donating compound (i) having a phthalic acid ester structure" is preferably 0.03 to 0.15, more preferably 0.05 to 0.13, further preferably 0.07 to 0.13.

The solid catalyst component for olefin polymerization according to the present invention having the ratio of the internal electron-donating compound that falls within the range described above can exert favorable ethylene responsiveness while forming a propylene homopolymer having high stereoregularity, when subjected to ethylene-propylene copolymerization reaction, and can easily yield a copolymer having a high content ratio of ethylene under high copolymerization activity.

In the solid catalyst component for olefin polymerization according to the present invention, the content ratio of the additional internal electron-donating compound may be 0.0 to 5.0% by mass.

In the present application, the respective content ratios of the electron-donating compound (i) having a phthalic acid ester structure, the electron-donating compound (ii) having two or more kinds of groups selected from an ether group, an ester group and a carbonate group and having no phthalic acid ester structure, and the additional internal electron-donating compound in the solid catalyst component for olefin polymerization mean values each individually measured from a calibration curve prepared in advance by gas chromatography using a standard solution.

Specifically, the content ratio of each internal electron-donating compound means a value determined using a calibration curve measured on the basis of a standard solution of the compound to be measured when a sample is measured under the following conditions using gas chromatography (manufactured by Shimadzu Corp., GC-14B).

<Measurement Conditions>

Column: packed column ($\phi$2.6×2.1 m, Silicone SE-30 10%, Chromosorb WAW DMCS 80/100, manufactured by GL Sciences Inc.)

Detector: FID (flame ionization detector)

Carrier gas: helium, flow rate of 40 ml/min

Measurement temperature: vaporizing chamber: 280° C., column: 225° C., detector: 280° C., or vaporizing chamber: 265° C., column: 180° C., detector: 265° C.

In the solid catalyst component for olefin polymerization according to the present invention, it is desirable for exerting its comprehensive performance with good balance that: the atom-based content ratio of the titanium should be 1.0 to 4.0% by mass; the atom-based content ratio of the magnesium should be 15.0 to 25.0% by mass; the atom-based content ratio of the halogen should be 45.0 to 75.0% by mass; the content ratio of the electron-donating compound (i) having a phthalic acid ester structure should be 10 to 20% by mass; and the content ratio of the electron-donating compound (ii) having two or more kinds of groups selected from an ether group, an ester group and a carbonate group and having no phthalic acid ester structure should be 0.5 to 20% by mass.

Examples of the method for producing the solid catalyst component for olefin polymerization according to the present invention can include the method for producing a solid catalyst component for olefin polymerization according to the present invention described below.

The present invention can provide a solid catalyst component for olefin polymerization which is capable of exerting favorable ethylene responsiveness while forming a propylene homopolymer having high stereoregularity, when subjected to ethylene-propylene copolymerization reaction.

(Method for Producing Solid Catalyst Component for Olefin Polymerization)

Next, the method for producing a solid catalyst component for olefin polymerization according to the present invention will be described.

The method for producing a solid catalyst component for olefin polymerization according to the present invention comprises in order the steps of:

(a) contacting dialkoxy magnesium, a tetravalent titanium halogen compound, and an electron-donating compound (i) having a phthalic acid ester structure with each other to obtain a contact product; and (b) contacting the contact product, a tetravalent titanium halogen compound, and an electron-donating compound (ii) having two or more kinds of groups selected from an ether group, an ester group and a carbonate group and having no phthalic acid ester structure with each other.

The method for producing a solid catalyst component for olefin polymerization according to the present invention is directed to a method for producing the solid catalyst component for olefin polymerization according to the present invention mentioned above.

The method for producing a solid catalyst component for olefin polymerization according to the present invention employs a magnesium compound and a tetravalent titanium halogen compound as starting material components serving as sources of supply of magnesium, titanium and halogen, and involves contacting these components with the electron-donating compound (i) having a phthalic acid ester structure and the electron-donating compound (ii) having two or more kinds of groups selected from an ether group, an ester group and a carbonate group and having no phthalic acid ester structure. In this case, the amount of each starting material component used is appropriately determined according to the content ratio of each component constituting the solid catalyst component for olefin polymerization to be obtained.

Hereinafter, each step of the method for producing a solid catalyst component for olefin polymerization according to the present invention will be described in detail.

In the method for producing a solid catalyst component for olefin polymerization according to the present invention, the step (a) involves contacting dialkoxy magnesium, a tetravalent titanium halogen compound, and an electron-donating compound (i) having a phthalic acid ester structure with each other to obtain a contact product.

In the method for producing a solid catalyst component for olefin polymerization according to the present invention, examples of the dialkoxy magnesium include one or more compounds selected from dimethoxy magnesium, diethoxy magnesium, dipropoxy magnesium, dibutoxy magnesium, ethoxymethoxy magnesium, ethoxypropoxy magnesium and butoxyethoxy magnesium. Among them, diethoxy magnesium is particularly preferred.

The dialkoxy magnesium may be obtained by reacting metal magnesium with an alcohol in the presence of a halogen-containing organometal or the like.

The dialkoxy magnesium is preferably in a granule form or a powder form, and its shape that may be used is indefinite or spherical.

In the case of using spherical dialkoxy magnesium, a polymer powder having a more favorable particle shape and having a (more spherical) narrow particle size distribution is obtained. The handleability of the polymer powder formed at the time of polymerization operation is improved, and occlusion, etc. attributed to a fine powder contained in the formed polymer powder can be prevented.

The spherical dialkoxy magnesium described above is not necessarily required to be truly spherical in shape, and dialkoxy magnesium having an oval shape or a potato shape may be used.

The average particle size (average particle size D50) of the dialkoxy magnesium is preferably 1.0 to 200.0 μm, more preferably 5.0 to 150.0 μm. In this context, the average particle size D50 means a particle size which is 50% of an integral particle size in a volume-integrated particle size distribution when measured using a laser light scattering/diffraction particle size analyzer.

The average particle size D50 of the spherical dialkoxy magnesium is preferably 1.0 to 100.0 μm, more preferably 5.0 to 80.0 μm, further preferably 10.0 to 70.0 μm.

The particle size distribution of the dialkoxy magnesium is preferably a narrow particle size distribution with fewer numbers of a fine powder and a coarse powder.

Specifically, the dialkoxy magnesium preferably contains 20% or less, more preferably 10% or less, of particles having a particle size of 5.0 μm or smaller measured using a laser light scattering/diffraction particle size analyzer. On the other hand, the dialkoxy magnesium preferably contains 20% or less, more preferably 10% or less, of particles having a particle size of 100.0 μm or larger measured using a laser light scattering/diffraction particle size analyzer.

The particle size distribution thereof, represented by ln (D90/D10) is preferably 3 or less, more preferably 2 or less. In this context, D90 represents a particle size which is 90% of an integral particle size in a volume-integrated particle size distribution when measured using a laser light scattering/diffraction particle size analyzer. D10 represents a particle size which is 10% of an integral particle size in a volume-integrated particle size distribution when measured using a laser light scattering/diffraction particle size analyzer.

One of these dialkoxy magnesiums may be used singly, or two or more thereof may be used in combination.

A method for producing the spherical dialkoxy magnesium as described above is illustrated in, for example, Japanese Patent Laid-Open Nos. 62-51633, 3-74341, 4-368391, and 8-73388.

In the solid catalyst component for olefin polymerization according to the present invention, the tetravalent titanium halogen compound which is a starting material component serving as a source of supply of titanium and halogen is not particularly limited and is preferably one or more compounds selected from the titanium halide or alkoxy titanium halide group represented by the following general formula (III):

$$\text{Ti}(OR^5)_r X_{4-r} \quad (III)$$

wherein $R^5$ represents an alkyl group having 1 to 4 carbon atoms, X represents a halogen atom such as a fluorine atom, a chlorine atom, a bromine atom, or an iodine atom; and r is $0 \leq r \leq 3$.

In the compound represented by the general formula (III), r is $0 < p \leq 3$, preferably 1, 2 or 3.

Examples of the titanium halide represented by the general formula (III) include one or more titanium tetrahalides selected from titanium tetrafluoride, titanium tetrachloride, titanium tetrabromide, and titanium tetraiodide.

Examples of the alkoxy titanium halide represented by the general formula (III) include one or more compounds selected from: alkoxy titanium trihalides such as methoxy titanium trichloride, ethoxy titanium trichloride, propoxy titanium trichloride, and n-butoxy titanium trichloride; dialkoxy titanium dihalides such as dimethoxy titanium dichloride, diethoxy titanium dichloride, dipropoxy titanium dichloride, and di-n-butoxy titanium dichloride; and tri-alkoxy titanium halides such as trimethoxy titanium chloride, triethoxy titanium chloride, tripropoxy titanium chloride, and tri-n-butoxy titanium chloride.

Among the tetravalent titanium halogen compounds, titanium tetrahalide such as titanium tetrafluoride, titanium tetrachloride, titanium tetrabromide, or titanium tetraiodide is particularly preferred.

In the method for producing a solid catalyst component for olefin polymerization according to the present invention, the details of the electron-donating compound (i) having a phthalic acid ester structure are as mentioned above.

In the method for producing a solid catalyst component for olefin polymerization according to the present invention, the amount of the tetravalent titanium halogen compound used in the step (a) differs depending on the composition of the solid catalyst component for olefin polymerization of interest and therefore cannot be generalized. The amount is, for example, preferably 0.5 to 10.0 mol, more preferably 1.0 to 5.0 mol, further preferably 1.8 to 2.5 mol, per mol of the dialkoxy magnesium.

In the method for producing a solid catalyst component for olefin polymerization according to the present invention, the electron-donating compound (i) having a phthalic acid ester structure, used in the step (a) is preferably 0.05 to 0.20 mol, more preferably 0.07 to 0.18 mol, further preferably 0.10 to 0.15 mol, per mol of the dialkoxy magnesium.

In the method for producing a solid catalyst component for olefin polymerization according to the present invention, the contact treatment in the step (a) may be performed, for example, in the presence of an additional reagent such as silicon, phosphorus, or aluminum, or a surfactant.

In the method for producing a solid catalyst component for olefin polymerization according to the present invention, the contact time in the step (a) is preferably 10 to 600 minutes, more preferably 30 to 300 minutes, further preferably 60 to 180 minutes.

In the step (a), the tetravalent titanium halogen compound and the electron-donating compound (i) having a phthalic acid ester structure may be added in a plurality of divided portions to the dialkoxy magnesium.

In this case, each contact treatment time can be adjusted so as to fall within the range described above.

The contact treatment in the step (a) is preferably performed while the components are stirred and mixed.

In the method for producing a solid catalyst component for olefin polymerization according to the present invention, the contact treatment in the step (a) is preferably performed in the presence of an inert organic solvent.

The inert organic solvent is preferably a solvent that dissolves the tetravalent titanium halogen compound and not dissolves the dialkoxy magnesium, and is, for example, preferably a saturated hydrocarbon compound or an aromatic hydrocarbon compound that has a boiling point on the order of 50 to 200° C. and is liquid at ordinary temperature.

Specific examples of the inert organic solvent include one or more solvents selected from: saturated hydrocarbon compounds such as pentane, hexane, heptane, octane, nonane, decane, cyclohexane, methylcyclohexane, ethylcyclohexane, 1,2-diethylcyclohexane, methylcyclohexene, decalin, and mineral oil; aromatic hydrocarbon compounds such as benzene, toluene, xylene, and ethylbenzene; and halogenated hydrocarbon compounds such as o-dichlorobenzene, methylene chloride, 1,2-dichlorobenzene, carbon tetrachloride, and dichloroethane.

The inert organic solvent is preferably at least one solvent selected from hexane, heptane, octane, ethylcyclohexane, mineral oil, toluene, xylene and ethylbenzene, particularly preferably at least one solvent selected from hexane, heptane, ethylcyclohexane and toluene.

The amount of the inert organic solvent used in the step (a) differs depending on a preparation method and therefore cannot be generalized. The amount of the inert organic solvent used is, for example, preferably 1.0 to 10.0, more preferably 2.0 to 5.0, in terms of a volume ratio to the tetravalent titanium halogen compound (amount of the inert organic solvent used (% by volume)/amount of the tetravalent titanium halogen compound used (% by volume)).

In the method for producing a solid catalyst component for olefin polymerization according to the present invention, in the case of performing the contact treatment in the step (a) in the presence of an inert organic solvent, the obtained suspension may be subjected as it is to the step (b), or after removal of a supernatant, the residue may be appropriately subjected to washing treatment using an inert organic solvent and then subjected to the step (b). Preferably, after removal of a supernatant, the residue is appropriately subjected to washing treatment using an inert organic solvent and then subjected to the step (b).

In the method for producing a solid catalyst component for olefin polymerization according to the present invention, the step (b) involves contacting the contact product obtained in the step (a), a tetravalent titanium halogen compound, and an electron-donating compound (ii) having two or more kinds of groups selected from an ether group, an ester group and a carbonate group and having no phthalic acid ester structure with each other.

In the method for producing a solid catalyst component for olefin polymerization according to the present invention, specific examples of the tetravalent titanium halogen compound used in the step (b) are the same as those mentioned above.

In this case, the tetravalent titanium halogen compound used in the step (b) may be the same as or different from the tetravalent titanium halogen compound used in the step (a).

In the method for producing a solid catalyst component for olefin polymerization according to the present invention, the amount of the tetravalent titanium halogen compound used in the step (b) differs depending on the composition of the solid catalyst component for olefin polymerization of interest and therefore cannot be generalized. The amount is, for example, preferably 0.5 to 10.0 mol, more preferably 1.0 to 5.0 mol, per mol of the dialkoxy magnesium used in the production of the solid catalyst component for olefin polymerization of interest.

In the method for producing a solid catalyst component for olefin polymerization according to the present invention, the amount of the electron-donating compound (ii) having two or more kinds of groups selected from an ether group, an ester group and a carbonate group and having no phthalic acid ester structure, used in the step (b) is preferably $2.0 \times 10^{-3}$ to $4.5 \times 10^{-2}$ mol, more preferably $2.5 \times 10^{-3}$ to $3.5 \times 10^{-2}$ mol, further preferably $3.0 \times 10^{-3}$ to $3.0 \times 10^{-2}$ mol, per mol of the dialkoxy magnesium used in the production of the solid catalyst component for olefin polymerization of interest.

The contact treatment in the step (b) may be performed, for example, in the presence of an additional reagent such as silicon, phosphorus, or aluminum, or a surfactant.

In the method for producing a solid catalyst component for olefin polymerization according to the present invention, the contact time in the step (b) is preferably 1 to 600 minutes, more preferably 3 to 180 minutes, further preferably 5 to 120 minutes.

In the step (b), the tetravalent titanium halogen compound and the electron-donating compound (ii) having two or more kinds of groups selected from an ether group, an ester group and a carbonate group and having no phthalic acid ester structure may be added in a plurality of divided portions to the contact product obtained in the step (a).

In this case, each contact treatment time can be adjusted so as to fall within the range described above.

The contact treatment in the step (b) is preferably performed while the components are stirred and mixed.

In the method for producing a solid catalyst component for olefin polymerization according to the present invention, the step (b) preferably involves contacting the contact product, the tetravalent titanium halogen compound, and the electron-donating compound (ii) having two or more kinds of groups selected from an ether group, an ester group and a carbonate group and having no phthalic acid ester structure with each other in the presence of an inert organic solvent.

In the method for producing a solid catalyst component for olefin polymerization according to the present invention, examples of the inert organic solvent used in the step (b) can include the same as those mentioned above.

In the method for producing a solid catalyst component for olefin polymerization according to the present invention, in the case of also using an inert organic solvent in the step (a), the inert organic solvent used in the step (b) may be the same as or different from the inert organic solvent used in the step (a).

In the method for producing a solid catalyst component for olefin polymerization according to the present invention, the contact treatment in at least one of the step (a) and the step (b) is preferably performed with heating.

In the production method, in the case of performing the contact treatment in the step (a) or the step (b) with heating, the heating temperature is preferably 70 to 150° C., more preferably 80 to 120° C., further preferably 90 to 110° C.

In this case, the heating temperatures in the step (a) and the step (b) may be the same or different.

In the contact treatment of the components, reaction is preferably performed with stirring in a container equipped with a stirrer under conditions free of moisture, etc. in an inert gas atmosphere.

After the completion of the reaction in the contact treatment, a reaction product in a wet state (slurry state) is obtained by leaving the obtained reaction solution standing and appropriately removing a supernatant.

In the method for producing a solid catalyst component for olefin polymerization according to the present invention, the obtained reaction solution is preferably subjected to washing treatment. Usually, the washing treatment is preferably performed using a washing solution (washing solvent).

Examples of the washing solvent can include the same as those mentioned above as the inert organic solvent. The washing solvent is preferably one or more compounds selected from, for example: linear aliphatic hydrocarbon compounds that are liquid at ordinary temperature and have a boiling point of 50 to 150° C., such as hexane, heptane, and decane; cyclic aliphatic hydrocarbon compounds that are liquid at ordinary temperature and have a boiling point of 50 to 150° C., such as methylcyclohexane and ethylcyclohexane; and aromatic hydrocarbon compounds that are liquid at ordinary temperature and have a boiling point of 50 to 150° C., such as toluene, xylene, ethylbenzene, and o-dichlorobenzene.

The washing solvent used easily dissolves and removes by-products or impurities from the reaction solution so that a reaction solution can be obtained after washing. The reaction solution thus washed may be further dried by hot-air drying or the like to obtain a solid catalyst component.

The washing treatment is preferably performed at a temperature of 0 to 120° C., more preferably at a temperature of 0 to 110° C., further preferably at a temperature of 30 to 110° C., still further preferably at a temperature of 50 to 110° C., even further preferably at a temperature of 50 to 100° C.

The washing treatment is preferably performed by adding a desired amount of the washing solution to the reaction solution, stirring the mixture, and then removing the liquid phase by a filtration method or a decantation method.

The washing may be performed a plurality of times (two or more times).

After the contact of the components with each other, impurities of unreacted starting material components or reaction by-products (alkoxy titanium halide, titanium tetrachloride-carboxylic acid complex, etc.) remaining in the reaction solution can be removed by the washing treatment.

The reaction product obtained by the washing treatment is usually in a suspension state. Each reaction product in such a suspension state can be prepared into a wet state (slurry state) by leaving the suspension standing and removing a supernatant, to obtain a solid catalyst component. The solid catalyst component in a wet state can be further dried by hot-air drying or the like to obtain the solid catalyst component of interest.

The present invention can provide a method for conveniently producing a solid catalyst component for olefin polymerization which is capable of exerting favorable ethylene responsiveness while forming a propylene homopolymer having high stereoregularity, when subjected to ethylene-propylene copolymerization reaction.

(Method for Producing Catalyst for Olefin Polymerization)

Next, the method for producing a catalyst for olefin polymerization according to the present invention will be described.

The method for producing a catalyst for olefin polymerization according to the present invention comprises contacting the solid catalyst component for olefin polymerization according to the present invention or a solid catalyst component for olefin polymerization obtained by the production method according to the present invention, and an organoaluminum compound represented by the following general formula (I):

$$R^1_p AlQ_{3-p} \quad (I)$$

wherein $R^1$ is an alkyl group having 1 to 6 carbon atoms, Q is a hydrogen atom or a halogen atom, p is 0<p≤3, when a plurality of $R^1$ are present, these $R^1$ are the same as or different from each other, and when a plurality of Q are present, these Q are the same as or different from each other, with each other to obtain a catalyst for olefin polymerization.

In the method for producing a catalyst for olefin polymerization according to the present invention, the details of the solid catalyst component for olefin polymerization according to the present invention or the solid catalyst component for olefin polymerization obtained by the production method according to the present invention are as mentioned above.

The organoaluminum compound represented by the general formula (I) is not particularly limited. Examples of $R^1$ include one or more groups selected from an ethyl group and an isobutyl group.

In the organoaluminum compound represented by the general formula (I), Q is a hydrogen atom or a halogen atom. Examples thereof include one or more atoms selected from a hydrogen atom, a chlorine atom and a bromine atom.

In the organoaluminum compound represented by the general formula (I), p is 0<p≤3, preferably 2, 2.5 or 3, more preferably 3.

Specific examples of the organoaluminum compound represented by the general formula (I) include one or more compounds selected from: trialkyl aluminums such as triethyl aluminum, triisopropyl aluminum, tri-n-butyl aluminum, and triisobutyl aluminum; alkyl aluminum halides such as diethyl aluminum chloride and diethyl aluminum bromide; and diethyl aluminum hydride. Among them, one or more compounds selected from, for example, alkyl aluminum halides such as diethyl aluminum chloride, and trialkyl aluminums such as triethyl aluminum, tri-n-butyl aluminum, and triisobutyl aluminum are preferred, and one or more compounds selected from triethyl aluminum and triisobutyl aluminum are more preferred.

In the method for producing a catalyst for olefin polymerization according to the present invention, the usage ratio of the organoaluminum compound represented by the general formula (I) is not particularly limited, and preferably 1 to 2000 mol, more preferably 50 to 1000 mol, of the organoaluminum compound is used per mol of a titanium atom in the solid catalyst component for olefin polymerization.

The method for producing a catalyst for olefin polymerization according to the present invention may comprise contacting the solid catalyst component for olefin polymerization according to the present invention or the solid catalyst component for olefin polymerization obtained by the production method according to the present invention, the organoaluminum compound represented by the general formula (I), and further, an external electron-donating compound with each other to obtain a catalyst for olefin polymerization.

In the method for producing a catalyst for olefin polymerization according to the present invention, the external electron-donating compound is not particularly limited as long as the external electron-donating compound acts as an electron donor at the time of polymerization of an olefin and is applicable to the catalyst for olefin polymerization.

Examples of the external electron-donating compound include organic compounds containing an oxygen atom or a nitrogen atom and specifically include one or more compounds selected from alcohols, phenols, ethers, esters, ketones, acid halides, aldehydes, amines, amides, nitriles, isocyanates, and organosilicon compounds, particularly, organosilicon compounds having a Si—O—C bond and aminosilane compounds having a Si—N—C bond.

Among the external electron-donating compounds, esters such as ethyl benzoate, ethyl p-methoxybenzoate, ethyl p-ethoxybenzoate, methyl p-toluate, ethyl p-toluate, methyl anisate, and ethyl anisate, 1,3-diethers, an organosilicon compound containing a Si—O—C bond, or an aminosilane compound containing a Si—N—C bond is preferred, and an organosilicon compound having a Si—O—C bond or an aminosilane compound having a Si—N—C bond is particularly preferred.

Among the external electron-donating compounds, examples of the organosilicon compound having a Si—O—C bond include organosilicon compounds represented by the following general formula (IV):

$$R^6_r Si(OR^7)_{4-q} \quad (IV)$$

wherein $R^6$ is an alkyl group having 1 to 12 carbon atoms, a cycloalkyl group having 3 to 12 carbon atoms, a phenyl group, a vinyl group, an allyl group or an aralkyl group, $R^7$ is an alkyl group having 1 to 4 carbon atoms, a cycloalkyl group having 3 to 6 carbon atoms, a phenyl group, a vinyl group, an allyl group or an aralkyl group and is the same or different when a plurality thereof is present, and q is 0≤q≤3.

In the organosilicon compound represented by the general formula (IV), q is 0 q 3, preferably 0, 1, 2 or 3.

Examples of the organosilicon compound represented by the general formula (IV) include organosilicon compounds such as phenylalkoxysilane, alkylalkoxysilane, phenylalkylalkoxysilane, cycloalkylalkoxysilane, and alkyl(cycloalkyl)alkoxysilane.

Specifically, one or more compounds selected from, for example, organosilicon compounds such as n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, and tetrabutoxysilane are preferred.

Among the external electron-donating compounds, examples of the aminosilane compound having a Si—N—C bond include aminosilane compounds represented by the following general formula (V):

$$(R^8R^9N)_s SiR^{10}_{4-s} \quad (V)$$

wherein $R^8$ and $R^9$ each represent a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group and are the same or different, or $R^8$ and $R^9$ are optionally bonded to each other to form a ring, $R^{10}$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group or an aryloxy group, when a plurality of $R^{10}$ are present, the plurality of $R^{10}$ are the same or different, and s is 1 to 3.

In the aminosilane compound represented by the general formula (V), s is 1 q 3, preferably 1, 2 or 3.

Examples of the aminosilane compound represented by the general formula (V) include aminosilane compounds such as (alkylamino)alkoxysilane, alkyl(alkylamino)alkoxysilane, cycloalkyl(alkylamino)alkoxysilane, tetrakis(alkylamino)silane, alkyltris(alkylamino)silane, dialkylbis(alkylamino)silane, and trialkyl(alkylamino)silane. Specifically, one or more compounds selected from t-butylmethylbis(ethylamino)silane, dicyclohexylbis(ethylamino)silane, dicyclopentylbis(ethylamino)silane, bis(perhydroisoquinolino)dimethoxysilane, diethylaminotriethoxysilane, and the like are preferred.

In the method for producing a catalyst for olefin polymerization according to the present invention, two or more organosilicon compounds represented by the general formula (IV) or two or more aminosilane compounds represented by the general formula (V) may be used in combination.

In the method for producing a catalyst for olefin polymerization according to the present invention, in the case of contacting the solid catalyst component for olefin polymerization according to the present invention or the solid catalyst component for olefin polymerization obtained by the production method according to the present invention, the organoaluminum compound represented by the general formula (I), and further, an external electron-donating compound with each other, the amount of the external electron-donating compound used is not particularly limited and is preferably 0.002 to 10.000 mol, more preferably 0.010 to 2.000 mol, further preferably 0.010 to 0.500 mol, per mol of the organoaluminum compound represented by the general formula (I).

In the method for producing a catalyst for olefin polymerization according to the present invention, the contact of the solid catalyst component for olefin polymerization according to the present invention or the solid catalyst component for olefin polymerization obtained by the production method according to the present invention, the organoaluminum compound represented by the general formula (I), and further, optionally the external electron-donating compound is preferably performed in the presence of an inert organic solvent.

Examples of the inert solvent can include those listed as the examples of the inert organic solvent that may be used in the method for producing a solid catalyst component for olefin polymerization according to the present invention mentioned above.

In the method for producing a catalyst for olefin polymerization according to the present invention, in the case of contacting the solid catalyst component for olefin polymerization according to the present invention or the solid catalyst component for olefin polymerization obtained by the production method according to the present invention with the organoaluminum compound represented by the general formula (I) without the use of an external electron-donating compound, examples of the method for contacting the solid catalyst component for olefin polymerization with the organoaluminum compound represented by the general formula (I) include the following methods (1) and (2):

(1) a method of charging a reaction container for production of the catalyst for olefin polymerization with the solid catalyst component for olefin polymerization, and subsequently charging the organoaluminum compound represented by the general formula (I) into the reaction container charged with the solid catalyst component for olefin polymerization, followed by stirring and mixing, and (2) a method of charging a reaction container for production of the catalyst for olefin polymerization with the organoaluminum compound represented by the general formula (I), and subsequently charging the solid catalyst component for olefin polymerization into the reaction container charged with the organoaluminum compound, followed by stirring and mixing.

The contact treatment by stirring and mixing may be performed in the presence of an inert organic solvent.

In the method for producing a catalyst for olefin polymerization according to the present invention, in the case of contacting the solid catalyst component for olefin polymerization according to the present invention or the solid catalyst component for olefin polymerization obtained by the production method according to the present invention, the organoaluminum compound represented by the general formula (I), and further, the external electron-donating compound with each other, examples of the method for contacting them include the following methods (1) to (4):

(1) a method of first contacting the organoaluminum compound represented by the general formula (I) and the external electron-donating compound with each other in a reaction container different from a reaction container for production of the catalyst for olefin polymerization, subsequently charging the contact product of the organoaluminum compound represented by the general formula (I) and the external electron-donating compound into a reaction container for production of the catalyst for olefin polymerization, and subsequently charging thereinto the solid catalyst component for olefin polymerization, followed by stirring and mixing, (2) a method of first contacting the organoaluminum compound represented by the general formula (I) and the external electron-donating compound with each other in a reaction container different from a reaction container for production of the catalyst for olefin polymerization, subsequently charging the solid catalyst component for olefin polymerization into a reaction container for production of the catalyst for olefin polymerization, and subsequently charging thereinto the contact product of the organoaluminum compound represented by the general formula (I) and the external electron-donating compound, followed by stirring and mixing, (3) a method of first charging the organoaluminum compound represented by the general formula (I) into a reaction container for production of the catalyst for olefin polymerization, subsequently charging thereinto the external electron-donating compound, followed by stirring and mixing, and subsequently charging thereinto the solid catalyst component for olefin polymerization, followed by stirring and mixing, and (4) a method of first charging the external electron-donating compound into a reaction container for production of the catalyst for olefin polymerization, subsequently charging thereinto the organoaluminum compound represented by the general formula (I), followed by stirring and mixing, and subsequently charging thereinto the solid catalyst component for olefin polymerization, followed by stirring and mixing.

The contact treatment by stirring and mixing may be performed in the presence of an inert organic solvent.

In the method for producing a catalyst for olefin polymerization according to the present invention, the contact treatment of the solid catalyst component for olefin polymerization according to the present invention or the solid catalyst component for olefin polymerization obtained by the production method according to the present invention, the organoaluminum compound represented by the general formula (I), and further, optionally the external electron-donating compound used may be performed in the absence of an olefin or may be performed in the presence of an olefin (in a reaction container for polymerization of an olefin).

In the method for producing a catalyst for olefin polymerization according to the present invention, the contact treatment of the solid catalyst component for olefin polymerization according to the present invention or the solid catalyst component for olefin polymerization obtained by the production method according to the present invention, the organoaluminum compound represented by the general formula (I), and further, optionally the external electron-donating compound used is preferably performed at a temperature of lower than 15° C., more preferably at −15° C. to 10° C., further preferably at 0° C. to 10° C.

In the method for producing a catalyst for olefin polymerization according to the present invention, the contact time for the contact treatment of the solid catalyst component for olefin polymerization according to the present invention or the solid catalyst component for olefin polymerization obtained by the production method according to the present invention, the organoaluminum compound represented by the general formula (I), and further, optionally the external electron-donating compound used is preferably 30 minutes or shorter, more preferably 5 seconds to 20 minutes, further preferably 30 seconds to 15 minutes, particularly preferably 1 minute to 10 minutes.

Usually, reaction proceeds rapidly upon contact of the organoaluminum compound serving as a promoter with the solid catalyst component for olefin polymerization so that the internal electron-donating compound constituting the solid catalyst component is eliminated or the solid catalyst component is activated by the organoaluminum compound serving as a promoter. Particularly, in an inert gas atmosphere, such overreaction facilitates deactivating a catalyst active point (titanium active point).

On the other hand, the contact treatment at the contact temperature for the contact time as described above can suppress the overreaction of the organoaluminum compound with the titanium active point in the solid catalyst component, and effectively suppress the deactivation of the catalyst active point.

The present invention can provide a method for conveniently producing a catalyst for olefin polymerization which is capable of exerting favorable ethylene responsiveness while forming a propylene homopolymer having high stereoregularity, when subjected to ethylene-propylene copolymerization reaction.

(Method for Producing Polymer of Olefin)

Next, the method for producing a polymer of an olefin according to the present invention will be described.

The method for producing a polymer of an olefin according to the present invention comprises polymerizing an olefin using a catalyst for olefin polymerization obtained by the production method according to the present invention.

In the method for producing a polymer of an olefin according to the present invention, the polymerization of an olefin is preferably the copolymerization of propylene and ethylene.

In the method for producing a polymer of an olefin according to the present invention, examples of the olefin to be polymerized can include ethylene and propylene, and examples of a monomer further copolymerizable therewith can include one or more monomers selected from 1-butene, 1-pentene, 4-methyl-1-pentene, and vinylcyclohexane.

The method for producing a polymer of an olefin according to the present invention preferably yields a block copolymer by the block copolymerization of propylene and ethylene. The block copolymer obtained by block copolymerization is a polymer comprising continuously varying segments of two or more monomer compositions and refers to a form in which two or more types of polymer chains (segments) differing in polymer primary structure such as monomer species, comonomer species, comonomer composition, comonomer contents, comonomer sequences, or stereoregularity are connected in one molecule. Examples of the olefin to be copolymerized can include ethylene and propylene, and examples of a monomer further copolymerizable therewith can include one or more monomers selected from 1-butene, 1-pentene, 4-methyl-1-pentene, and vinylcyclohexane.

In the method for producing a polymer of an olefin according to the present invention, the polymerization of an olefin can be performed in the presence or absence of an organic solvent.

The olefin to be polymerized can be used in any of gas and liquid states.

The polymerization of an olefin can be performed, for example, under heating and pressure by introducing the olefin in the presence of the catalyst for olefin polymerization obtained by the production method according to the present invention in a reactor such as an autoclave.

In the method for producing a polymer of an olefin according to the present invention, preliminary polymerization (hereinafter, appropriately referred to as pre-polymerization) may be performed, prior to the polymerization of an olefin (hereinafter, appropriately referred to as main polymerization), by contacting a portion or the whole of the constituents of the catalyst for olefin polymerization obtained by the production method according to the present invention with the olefin to be polymerized.

For the pre-polymerization, the contact of the constituents of the catalyst for olefin polymerization obtained by the production method according to the present invention, and the olefin may be in any order. Preferably, the organoaluminum compound is first charged into a pre-polymerization system set to an inert gas atmosphere or an olefin gas atmosphere, and subsequently, after contact of the solid catalyst component for olefin polymerization, one or more olefins such as propylene are contacted therewith.

For the pre-polymerization, the same olefin as those for the main polymerization can be used.

In the method for producing a polymer of an olefin according to the present invention, the pre-polymerization temperature is usually 5 to 30° C., preferably 10 to 30° C., more preferably 15 to 25° C. The pre-polymerization pressure is not particularly limited and is preferably 1.0 to 2.0 MPa, more preferably 1.0 to 1.5 MPa.

The pre-polymerization improves catalyst activity and facilitates further improving the stereoregularity and particle properties, etc. of the resulting polymer.

In the method for producing a polymer of an olefin according to the present invention, the main polymerization temperature is usually 50 to 80° C., preferably 60 to 80° C., more preferably 65 to 75° C.

The main polymerization pressure is not particularly limited and is preferably 2.0 to 4.0 MPa, more preferably 2.5 to 4.0 MPa. The main polymerization is attained by any of a continuous polymerization method and a batch polymerization method. The polymerization reaction may be performed by one stage or may be performed by two or more stages.

In the method for producing a polymer of an olefin according to the present invention, a polymerization scheme, polymerization conditions, and the like known in the art are appropriately selected as a polymerization scheme, polymerization conditions, and the like for the polymerization of the olefin.

In the method for producing a polymer of an olefin according to the present invention, for example, the pre-polymerization at 5 to 30° C. and subsequently the main polymerization at 60 to 80° C. are preferably performed in the presence of the catalyst for olefin polymerization obtained by the method for producing a catalyst for olefin polymerization according to the present invention.

The present invention can provide a method for producing a polymer of an olefin under favorable ethylene responsiveness while forming a propylene homopolymer having high stereoregularity.

Next, the present invention will be described further specifically with reference to Examples. However, these examples are given for illustrative purposes and do not limit the present invention.

EXAMPLES

<Method for Measuring Content and the Number of Mole of Internal Electron-Donating Compound>

In Examples and Comparative Examples given below, the content of an internal electron-donating compound in a solid catalyst component for olefin polymerization was measured under the conditions given below using gas chromatography (manufactured by Shimadzu Corp., GC-14B).

The number of moles of the internal electron-donating compound in the solid catalyst component for olefin polymerization and in a catalyst for olefin polymerization was determined from a calibration curve measured on the basis of a standard solution of the internal electron-donating compound when the content of the internal electron-donating compound was measured.

[Measurement Conditions]
　Column: packed column (φ2.6×2.1 m, Silicone SE-30 10%, Chromosorb WAW DMCS 80/100, manufactured by GL Sciences Inc.)
　Detector: FID (flame ionization detector)
　Carrier gas: helium, flow rate of 40 mL/min
　Measurement temperature: vaporizing chamber: 280° C., column: 225° C., detector: 280° C., or vaporizing chamber: 265° C., column: 180° C., detector: 265° C.

Example 1

<Production of Solid Catalyst Component for Olefin Polymerization>

A round-bottom flask (capacity: 500 mL) equipped with a stirrer and purged with nitrogen gas was charged with 38 mL of titanium tetrachloride (titanium halogen compound) and 44 mL of toluene (inert organic solvent) to form a mixed solution. Subsequently, a suspension formed using 20 g of diethoxy magnesium, 88 mL of toluene and 0.8 mL of di-normal butyl phthalate (internal electron-donating compound) was added into the mixed solution kept at a liquid temperature of −6° C.

Then, the liquid temperature of the suspension containing the mixed solution was elevated from −6° C. to 100° C. During this process, 4.8 mL of di-normal butyl phthalate was added thereto. The mixture was reacted with stirring at 100° C. for 1.5 hours to obtain a solid product.

After the completion of the reaction, a supernatant was removed. The obtained solid product was washed four times with 125 mL of toluene of 90° C., 20 mL of titanium tetrachloride, 80 mL of toluene, and 0.2 mL of 2-isopropyl-2-isopentyl-1,3-dimethoxypropane were newly added thereto, and the mixture was heated to 100° C. and reacted with stirring for 5 minutes, followed by the removal of a supernatant. This step was repeated twice. Subsequently, 20 mL of titanium tetrachloride and 80 mL of toluene were newly added thereto, and the mixture was heated to 100° C. and reacted with stirring for 5 minutes, followed by the removal of a supernatant. After the completion of the reaction, the obtained product was washed eight times with 100 mL of n-heptane (inert organic solvent) of 40° C. to obtain a solid catalyst component for olefin polymerization.

The obtained solid catalyst component for olefin polymerization contained 15.8% by mass of di-normal butyl phthalate as the internal electron-donating compound and contained 0.8% by mass of 2-isopropyl-2-isopentyl-1,3-dimethoxypropane.

<Preparation of Catalyst for Olefin Polymerization>

An autoclave (internal volume: 2.0 L) with a stirrer purged with nitrogen gas was charged with 2.2 mmol of triethyl aluminum, 0.22 mmol of diisopropyldimethoxysilane (DIPDMS) and 0.003 mmol (in terms of a titanium atom) of the solid catalyst component for olefin polymerization to prepare an ethylene-propylene copolymerization catalyst.

<Production of Propylene Block Copolymer>

The autoclave with a stirrer containing the ethylene-propylene copolymerization catalyst was charged with 15 mol of liquefied propylene and 0.20 MPa (partial pressure) of hydrogen gas, and pre-polymerization was performed at 20° C. for 5 minutes. Then, propylene homopolymerization reaction (homo stage) at the first stage (previous stage) was performed at 65° C. for 45 minutes. After the completion of polymerization at the homo stage, the monomer was purged while the temperature of the reactor was lowered to room temperature. Then, the total weight of the autoclave was measured, and the amount of the polymer obtained at the previous stage was determined from the difference between the total weight and a weight weighed in advance before the start of polymerization.

A portion of the polymer was sampled for MFR measurement under nitrogen. Then, a monomer supply line and the like were connected again to the autoclave, and ethylene, propylene and hydrogen were added at an ethylene/propylene/hydrogen molar ratio of 1.7/2.3/0.086 to the autoclave with a stirrer, which was then warmed to 70° C. While ethylene, propylene and hydrogen were introduced thereto at an ethylene/propylene/hydrogen ratio of 1.7/2.3/0.086 in terms of L/min, copolymerization reaction was performed under conditions of 1.2 MPa, 70° C., and 1 hour to obtain a propylene block copolymer (ICP (impact copolymer)).

According to the methods given below, The obtained propylene block copolymer was evaluated for sustained polymerization activity by measuring polymerization activity at the time of polymerization reaction at the homo stage (PP polymerization activity (g/g-cat)) and propylene block copolymer activity at the time of copolymerization reaction (ICP (impact copolymer) polymerization activity) (g/(g-cat)). In addition, a xylene-soluble content in the propylene homopolymer (XS of homo PP) obtained through polymerization reaction at the homo stage, an ethylene-propylene copolymer (EPR) content (xylene-soluble content in ICP), an ethylene content (% by mass) in the xylene-soluble fraction (XS) of ICP, an ethylene content (% by mass)) in the xylene-insoluble fraction (XI) of ICP and an ethylene response index were measured. The obtained results are shown in Table 1.

<PP Polymerization Activity>

Propylene polymerization activity per g of the solid catalyst component for olefin polymerization (PP polymerization activity) was calculated according to the following expression.

PP polymerization activity (g/g-cat)=Mass (g) of the obtained polypropylene/Mass (g) of the solid catalyst component for olefin polymerization (ICP Polymerization Activity)

Propylene block copolymerization activity per g of the solid catalyst component was determined according to the following expression.

Propylene block copolymerization activity (g/g-cat) $=(I\,(g)-F\,(g)+J\,(g))/[\{Mass\,(g)\,of\,the\,solid\,catalyst\,component\,in\,the\,catalyst\,for\,olefin\,polymerization\times((G\,(g)-F\,(g)-J\,(g))\}/(G\,(g)-F\,(g)))]$ wherein I represents an autoclave mass (g) after the completion of copolymerization reaction, F represents an autoclave mass (g), G represents an autoclave mass (g) after removal of unreacted monomers after the completion of PP homopolymerization, and J represents the amount (g) of the polymer extracted after homopolymerization.

<Xylene-Soluble Content in Propylene Homopolymer (XS of Homo PP)>

A flask equipped with a stirring apparatus was charged with 4.0 g of the polymer (polypropylene) and 200 mL of p-xylene. Then, the outside temperature was set to approximately 150° C., stirring was continued for 2 hours while keeping the reflux of p-xylene (the boiling point: 137 to 138° C.) in the flask to dissolve the above polymer. Then, this solution was cooled to 23° C. over 1 hour, and an undissolved component and a dissolved component were separated by filtration. The solution of the dissolved component was collected, and p-xylene was evaporated by heating (drying) under reduced pressure. The weight of the residue was calculated, and its relative ratio (% by mass) to the polymer (polypropylene) was calculated to determine a xylene-soluble content (XS).

<EPR Content (Xylene-Soluble Content in ICP)>

A flask equipped with a stirring apparatus was charged with 5.0 g of the propylene block copolymer (ICP) and 250 mL of p-xylene. Then, the outside temperature was set to approximately 150° C., stirring was continued for 2 hours while keeping the reflux of p-xylene (the boiling point: 137 to 138° C.) in the flask to dissolve the above polymer. Then, this solution was cooled to the liquid temperature of 23° C. over 1 hour, and an undissolved component and a dissolved component were separated by filtration. The solution of the dissolved component was collected, and p-xylene was distilled off by heating and drying under reduced pressure. The weight of the obtained residue was determined, and its relative ratio (% by mass) to the propylene block copolymer used was calculated and used as an EPR content.

<Ethylene Content in Xylene-Soluble Fraction (XS) of ICP>

A flask equipped with a stirring apparatus was first charged with 5.0 g of the propylene block copolymer (ICP) and 250 mL of p-xylene. Then, the outside temperature was set to approximately 150° C., stirring was continued for 2 hours while keeping the reflux of p-xylene (the boiling point: 137 to 138° C.) in the flask to dissolve the above polymer. Then, this solution was cooled to the liquid temperature of 23° C. over 1 hour, and an undissolved component and a dissolved component were separated by filtration. The solution of the dissolved component was collected, and p-xylene was distilled off by heating and drying under reduced pressure to obtain an EPR moiety (xylene-soluble fraction (XS)).

Next, a small amount of the obtained EPR moiety (xylene-soluble fraction (XS)) was sampled and formed into a film with a hot press. Then, an ethylene content in the xylene-soluble fraction (XS) of ICP was calculated, on the basis of a calibration curve prepared from a plurality of samples having a known content, from absorbance measured using a Fourier transform infrared spectrophotometer (FT-IR) (Thermo Nicolet Avatar manufactured by Thermo Fisher Scientific Inc.) and the thickness of the film.

Measurement wavelength: 720 $cm^{-1}$ and 1150 $cm^{-1}$

Film thickness: 0.1 to 0.2 mm

<Ethylene Content in Xylene-Insoluble Fraction of ICP>

A small amount of a xylene-insoluble moiety (xylene-insoluble component (XI)) obtained by xylene extraction in measuring the ethylene content in EPR was sampled and formed into a film with a hot press. Then, an ethylene content in the xylene-insoluble component (XI) of ICP was calculated in the same manner as in the ethylene content in the xylene-soluble fraction (XS) of ICP.

<Ethylene Response Index>

The ethylene response index was defined as follows.

Ethylene response index=(Amount [g] of ethylene contained in the polymer formed at the copolymerization stage)/(Amount [g] of the polymer formed at the copolymerization stage).

In this context, the amount [g] of ethylene contained in the polymer formed at the copolymerization stage was determined according to "Amount [g] of ICP formed×EPR content [% by mass]×($\frac{1}{100}$)×Ethylene content [% by mass] in the xylene-soluble fraction of ICP×($\frac{1}{100}$)+Amount [g] of ICP formed×(100−(EPR content)) [% by mass]×($\frac{1}{100}$)× (100−(Ethylene content in the xylene-soluble fraction of ICP)) [% by mass]×($\frac{1}{100}$)".

The amount [g] of the polymer formed at the copolymerization stage was determined according to "(Autoclave mass [g] after removal of unreacted monomers after the completion of copolymerization)−{(Autoclave mass [g] after removal of unreacted monomers after the completion of PP homopolymerization)−(Amount [g] of the polymer extracted after homopolymerization)}".

Example 2

A solid catalyst component for olefin polymerization was obtained in the same manner as in Example 1 except that 0.3 mL of (2-ethoxyethyl)ethyl carbonate was added instead of adding 0.2 mL of 2-isopropyl-2-isopentyl-1,3-dimethoxypropane. Then, a catalyst for olefin polymerization was prepared, and EPR (ICP polymer) was obtained. Analysis results thereof are shown in Table 1.

Example 3

A solid catalyst component for olefin polymerization was obtained in the same manner as in Example 1 except that 0.6 mL of (2-ethoxyethyl)ethyl carbonate was added instead of adding 0.2 mL of 2-isopropyl-2-isopentyl-1,3-dimethoxypropane. Then, a catalyst for olefin polymerization was prepared, and EPR (ICP polymer) was obtained. Analysis results thereof are shown in Table 1.

Example 4

A solid catalyst component for olefin polymerization was obtained in the same manner as in Example 1 except that 0.4 g of 9,9-bis(methoxymethyl)fluorene was added instead of adding 0.2 mL of 2-isopropyl-2-isopentyl-1,3-dimethoxypropane. Then, a catalyst for olefin polymerization was prepared, and EPR (ICP polymer) was obtained. Analysis results thereof are shown in Table 1.

Comparative Example 1

<Production of Solid Catalyst Component for Olefin Polymerization>

A round-bottom flask (capacity: 500 mL) equipped with a stirrer and purged with nitrogen gas was charged with 38 mL of titanium tetrachloride (titanium halogen compound), 37 mL of toluene (inert organic solvent), and 7 mL of heptane to form a mixed solution. Subsequently, a suspension formed using 20 g of diethoxy magnesium, 73 mL of toluene, 15 mL of heptane, and 0.8 mL of di-normal butyl phthalate (internal electron-donating compound) was added into the mixed solution kept at a liquid temperature of −6° C.

Then, the liquid temperature of the suspension containing the mixed solution was elevated from −6° C. to 100° C. During this process, 4.8 mL of di-normal butyl phthalate was added thereto. The mixture was reacted with stirring at 100° C. for 1.5 hours to obtain a solid product.

After the completion of the reaction, a supernatant was removed. The obtained solid product was washed four times with 125 mL of toluene of 90° C., 20 mL of titanium tetrachloride and 80 mL of toluene were newly added thereto, and the mixture was heated to 100° C. and reacted with stirring for 5 minutes, followed by the removal of a supernatant. This step was repeated three times. Subsequently, 20 mL of titanium tetrachloride and 80 mL of toluene were newly added thereto, and the mixture was heated to 100° C. and reacted with stirring for 5 minutes, followed by the removal of a supernatant. After the completion of the reaction, the obtained product was washed eight times with 100 mL of n-heptane (inert organic solvent) of 40° C. to obtain a solid catalyst component for olefin polymerization (i.e., no internal electron donor component was added in this step).

A catalyst for olefin polymerization was prepared in the same manner as in Example 1 using the solid catalyst component for olefin polymerization, and EPR (ICP polymer) was obtained. Analysis results thereof are shown in Table 1.

Comparative Example 2

A solid catalyst component for olefin polymerization was obtained in the same manner as in Example 1 except that the amount of 2-isopropyl-2-isopentyl-1,3-dimethoxypropane used was changed from 0.2 mL to 0.1 mL. Then, a catalyst for olefin polymerization was prepared, and EPR (ICP polymer) was obtained. Analysis results thereof are shown in Table 1.

Comparative Example 3

A solid catalyst component for olefin polymerization was obtained in the same manner as in Example 1 except that 1.2 mL of (2-ethoxyethyl)ethyl carbonate was added instead of adding 0.2 mL of 2-isopropyl-2-isopentyl-1,3-dimethoxypropane. Then, a catalyst for olefin polymerization was prepared, and EPR (ICP polymer) was obtained. Analysis results thereof are shown in Table 1.

TABLE 1

| | ID1 content (mass %) | ID2 content (mass %) | ID2 content/ ID1 content (mol/mol) | PP polymerization activity (g/g-cat) | ICP polymerization activity (g/g-cat) | XS of homo PP (mass %) | EPR content (mass %) | Ethylene content of ICP (mass %) In XS | Ethylene content of ICP (mass %) In XI | Ethylene response index |
|---|---|---|---|---|---|---|---|---|---|---|
| Example 1 | 15.8 | 0.8 | 0.07 | 50,600 | 28,500 | 0.9 | 32.0 | 33.0 | 6.5 | 41.6 |
| Example 2 | 13.9 | 0.5 | 0.06 | 44,900 | 28,800 | 1.1 | 33.1 | 32.6 | 6.6 | 38.9 |
| Example 3 | 13.1 | 0.7 | 0.09 | 48,000 | 35,000 | 1.3 | 37.8 | 32.2 | 7.6 | 40.2 |
| Example 4 | 13.9 | 0.5 | 0.04 | 47,300 | 26,300 | 1.0 | 30.1 | 33.1 | 5.7 | 38.9 |
| Comparative Example1 | 14.5 | 0.0 | 0.00 | 63,400 | 41,700 | 1.8 | 33.7 | 31.6 | 6.4 | 37.5 |
| Comparative Example2 | 15.8 | 0.4 | 0.03 | 52,800 | 33,900 | 1.5 | 32.4 | 32.3 | 6.4 | 37.9 |
| Comparative Example3 | 13.5 | 1.7 | 0.22 | 48,400 | 35,400 | 1.5 | 36.5 | 32.0 | 6.6 | 37.6 |

<Abbreviation in table>
ID1: Electron-donating compound having a phthalic acid ester structure
ID2: Electron-donating compound having two or more kinds of groups selected from an ether group, an ester group and a carbonate group and having no phthalic acid ester structure As is evident from Table 1, the solid catalyst components for olefin polymerization obtained in Example 1 to Example 4 contain titanium, magnesium, halogen, and an internal electron-donating compound and also contain, as the internal electron-donating compound, an electron-donating compound (i) having a phthalic acid ester structure, and an electron-donating compound (ii) having two or more kinds of groups selected from an ether group, an ester group and a carbonate group and having no phthalic acid ester structure, wherein the content ratio of the electron-donating compound (ii) having two or more kinds of groups selected from an ether group, an ester group and a carbonate group and having no phthalic acid ester structure is 0.5 to 1.5% by mass, whereby the solid catalyst components can form a propylene homopolymer having high stereoregularity because of low XS of homo PP, when subjected to ethylene-propylene copolymerization reaction, and in addition, are capable of exerting favorable ethylene responsiveness because of excellent ICP activity, a high amount of ethylene in XS of the obtained ICP (in EPR), and an excellent ethylene response index.

By contrast, as is evident from Table 1, the solid catalyst components for olefin polymerization obtained in Comparative Example 1 to Comparative Example 3 are not capable of forming a propylene homopolymer having high stereoregularity due to a high XS value of homo PP because the content ratio of the electron-donating compound (ii) having two or more kinds of groups selected from an ether group, an ester group and a carbonate group and having no phthalic acid ester structure falls outside the predetermined range, and in addition, are inferior in ethylene response due to a low ethylene response index.

The present invention can provide a solid catalyst component for olefin polymerization which is capable of exerting favorable ethylene responsiveness while forming a propylene homopolymer having high stereoregularity, when subjected to ethylene-propylene copolymerization reaction, and can provide a method for producing a solid catalyst component for olefin polymerization, a method for producing a catalyst for olefin polymerization and a method for producing a polymer of an olefin.

What is claimed is:

1. A solid catalyst component for olefin polymerization, comprising titanium, magnesium, halogen, and an internal electron-donating compound, wherein
   the internal electron-donating compound comprises
   an electron-donating compound (i) having a phthalic acid ester structure, and
   an electron-donating compound (ii) having two or more groups selected form ether groups, ester groups, or a combination thereof and an ester group and having no phthalic acid ester structure, wherein
   a mass percentage of the electron-donating compound (ii) in the solid catalyst component is 0.5 to 1.5% by mass.

2. A method for producing a solid catalyst component for olefin polymerization, comprising in order the steps of:
   (a) contacting dialkoxy magnesium, a tetravalent titanium halogen compound, and an electron-donating compound (i) having a phthalic acid ester structure with each other to obtain a contact product; and
   (b) contacting the contact product, a tetravalent titanium halogen compound, and an electron-donating compound (ii) having two or more groups selected form ether groups, ester groups, or a combination thereof and an ester group and having no phthalic acid ester structure with each other.

3. A method for producing a catalyst for olefin polymerization, comprising contacting the solid catalyst component for olefin polymerization according to claim 1, and an organoaluminum compound represented by the following general formula (I):

$$R^1_p AlQ_{3-p} \quad (I)$$

wherein $R^1$ is an alkyl group having 1 to 6 carbon atoms, Q is a hydrogen atom or a halogen atom, p is 0<p£3, when a plurality of $R^1$ are present, these $R^1$ are the same as or different from each other, and when a plurality of Q are present, these Q are the same as or different from each other, with each other to obtain a catalyst for olefin polymerization.

4. The method for producing a catalyst for olefin polymerization according to claim 3, comprising contacting the solid catalyst component for olefin polymerization, the organoaluminum compound represented by the general formula (I), and further, an external electron-donating compound with each other to obtain a catalyst for olefin polymerization.

5. A method for producing a polymer of an olefin, comprising polymerizing an olefin using a catalyst for olefin polymerization obtained by the production method according to claim 3.

6. A method for producing a catalyst for olefin polymerization, comprising contacting a solid catalyst component for olefin polymerization obtained by the production method according to claim 2, and an organoaluminum compound represented by the following general formula (I):

$$R^1_p AlQ_{3-p} \quad (I)$$

wherein $R^1$ is an alkyl group having 1 to 6 carbon atoms, Q is a hydrogen atom or a halogen atom, p is 0<p£3, when a plurality of $R^1$ are present, these $R^1$ are the same as or different from each other, and when a plurality of Q are present, these Q are the same as or different from each other, with each other to obtain a catalyst for olefin polymerization.

7. The method for producing a catalyst for olefin polymerization according to claim 6, comprising contacting the solid catalyst component for olefin polymerization, the organoaluminum compound represented by the general formula (I), and further, an external electron-donating compound with each other to obtain a catalyst for olefin polymerization.

8. A method for producing a polymer of an olefin, comprising polymerizing an olefin using a catalyst for olefin polymerization obtained by the production method according to claim 4.

* * * * *